United States Patent
Wong et al.

(10) Patent No.: US 9,065,748 B2
(45) Date of Patent: Jun. 23, 2015

(54) SYMMETRICAL LATENCY WITH TDM CIRCUIT EMULATED SERVICE

(71) Applicant: Alcatel-Lucent Canada Inc., Ottawa (CA)

(72) Inventors: Kin Yee Wong, Ottawa (CA); Peter Roberts, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 182 days.

(21) Appl. No.: 13/890,304

(22) Filed: May 9, 2013

(65) Prior Publication Data

US 2014/0334311 A1     Nov. 13, 2014

(51) Int. Cl.
| | |
|---|---|
| *H04J 3/06* | (2006.01) |
| *G01R 31/08* | (2006.01) |
| *H04L 12/66* | (2006.01) |
| *H04L 12/801* | (2013.01) |
| *H04L 12/841* | (2013.01) |

(52) U.S. Cl.
CPC .............. *H04L 47/12* (2013.01); *H04L 47/283* (2013.01)

(58) Field of Classification Search
CPC ......... H04L 12/66; H04L 12/28; H04L 12/26; H04L 47/12; H04L 12/56; H04L 12/801; G06F 15/16; G06F 3/00
USPC ................ 370/230–236, 294, 314, 350–357, 370/395.5, 395.53, 400, 395.4
See application file for complete search history.

(56) References Cited

U.S. PATENT DOCUMENTS

| | | | |
|---|---|---|---|
| 7,170,856 B1 * | 1/2007 | Ho et al. ....................... 370/230 |
| 7,953,004 B2 * | 5/2011 | Poulin et al. .................. 370/230 |
| 8,023,505 B2 * | 9/2011 | Gerosa et al. ................. 370/389 |
| 8,243,599 B2 * | 8/2012 | Becker et al. ................. 370/232 |
| 2004/0190537 A1 | 9/2004 | Ferguson et al. | |
| 2007/0189164 A1 | 8/2007 | Smith et al. | |
| 2013/0036239 A1 * | 2/2013 | Spencer ....................... 709/248 |

* cited by examiner

*Primary Examiner* — Hanh N Nguyen
(74) *Attorney, Agent, or Firm* — Marks & Clerk; S. Mark Budd

(57) ABSTRACT

A method and system are provided for allowing time-alignment of teleprotection measurements of power signals. Teleprotection observations are communicated between teleprotection ends through a packet switched network. At each end of a teleprotection segment, a teleprotection device communicates with the network through a router providing CES and located at the edge of the network. Clocks within the two routers are synchronized using IEEE 1588v2 signals. Using this synchronization, accurate one-way latency of data through the network between the two routers in each direction can be determined. The router at the incoming end of the faster path delays playout of packets by the difference between the two one-way latencies, thereby ensuring time-alignment of observations as they are sent from the routers to the teleprotection devices.

19 Claims, 5 Drawing Sheets

SYMMETRICAL LATENCY WITH TDM CIRCUIT EMULATED SERVICE

FIELD OF INVENTION

This invention relates to teleprotection in power grids, and more particularly to symmetric communication of teleprotection signals.

BACKGROUND

Teleprotection is an essential requirement for operating and maintaining a reliable, robust, and safe electrical power grid. The current of a power signal is measured at a first location and transmitted over a communication channel to a second location. Simultaneously, the current of the power signal is measured at the second location and transmitted over a communication channel to the first location. Comparison of time-aligned observations of the power signal may reveal different measured values of the current at each location. This is usually indicative of a fault in the power grid, and action can be taken to remedy the fault.

The current is measured several times per cycle of the power, and therefore time-alignment is very important. There is inevitably some delay in communicating between the two locations, but TDM networks offer a very symmetric communication channel. Delays introduced by the communication channel in one direction are generally the same as delays introduced by the communication channel in the other direction. The delays are effectively the same in each direction, so time-alignment of observations is still possible.

Nowadays core networks are evolving to packet switched networks. However legacy systems still require TDM services. Circuit Emulation Services (CES) are used to provide TDM services, as are required by legacy teleprotection systems, over packet switched networks. The routers at the edge of the packet switched network provide CES, and the devices of the teleprotection system which measure the current of the power signal send their measured observations to the routers over T1/E1 lines. The routers use their CES to transmit the measured observations to each other as packet data. The observations are then converted back into TDM format and sent to the teleprotection devices over T1/E1 lines, where they are used in teleprotection analysis.

However packet networks are asymmetric, in that the delay introduced by the network in one direction is not necessarily the same as the delay introduced by the network in the other direction. Differences between the delays may arise for example because different paths are used in the directions, or because of differences in store-and-forward techniques along the paths. The asymmetry in communications makes time-alignment of the power observations difficult, and therefore teleprotection analysis more difficult.

A system and method which allowed improved time-alignment of observations even when transmitted over asymmetric communication networks would allow teleprotection systems to better use packet switched networks.

SUMMARY

According to one aspect, a method of providing Circuit Emulation Service over Packet (CESoP) over a packet switched network is provided. The packet switched network includes a first router in TDM communication with a first device and a second router in TDM communication with a second device. The first router and the second router are separated by the packet switched network. The one-way latency from the second router to the first router is determined, this latency being termed the inbound latency. The one-way latency from the first router to the second router is determined, this latency being termed the outbound latency. The inbound latency and the outbound latency are compared. If the outbound latency is lower than the inbound latency, TDM playout to the first device is initiated when a jitter buffer reaches a playout level. If the inbound latency is lower than the outbound latency, TDM playout to the first device is initiated after the jitter buffer reaches the playout level and then a duration equivalent to the difference between the inbound latency and the outbound latency has elapsed.

According to another aspect, a first router providing Circuit Emulation Service over Packet (CESoP) to a first device is provided. The router includes a CESoP processor for receiving packets received over a packet switched network and playing out the packets into a TDM bitstream to the first device. The router also includes a jitter buffer. The router also includes a symmetry enforcer for determining a difference between (1) the one-way latency from the first router to a second router providing CESoP to a second device and with which the first router is in communication over the packet switched network and (2) the one-way latency from the second router to the first router, and for initiating TDM playout to the first device after the fill level of the jitter buffer reaches a playout level and then a duration equal to the difference between the one-way latencies has elapsed.

According to yet another aspect, another method of providing Circuit Emulation Service over Packet (CESoP) over a packet switched network is provided. The packet switched network includes a first router in TDM communication with a first device and a second router in TDM communication with a second device. The first router and the second router are separated by the packet switched network. At each router, the one-way latency from the second router to the first router is determined, this latency being termed the inbound latency for the first router and the outbound latency for the second router. At each router, the one-way latency from the first router to the second router is also determined, this latency being termed the outbound latency for the first router and the inbound latency of the second router. At each router, the inbound latency and the outbound latency of the router are compared. At each router, if the outbound latency of the router is lower than the inbound latency of the router, TDM playout to the device in TDM communication with the router is initiated when the jitter buffer of the router reaches a playout level. At each router, if the inbound latency of the router is lower than the outbound latency of the router, TDM playout to the device in TDM communication with the router is initiated after the jitter buffer of the router reaches the playout level and then a duration equivalent to the difference between the inbound latency and the outbound latency has elapsed.

According to yet another aspect, a system for providing CESoP between two devices is provided. A first router is located at the edge of a packet switched network and is in TDM communication with a first of the devices. The first router has a jitter buffer, and initiates TDM playout of packets to the first device after the fill level of its jitter buffer reaches a playout level. A second router is located at the edge of the packet switched network and is in TDM communication with the second of the devices. The second router has a jitter buffer, and initiates TDM playout of packets to the second device only after the fill level of its jitter buffer reaches the playout level and then a duration equal to the difference between the two one-way latencies between the routers has elapsed.

The methods of embodiments of the invention may be stored as logical instructions on a non-transitory computer-readable storage medium in a form executable by a computer processor.

Embodiments of the invention allow teleprotection communications to occur over a packet switched network. By synchronizing the routers and by using different playout times in each router, differences in one-way latency over the packet switched network can be compensated for, allowing accurate teleprotection to be carried out even over a packet switched network.

BRIEF DESCRIPTION OF THE DRAWINGS

The features and advantages of embodiments of the invention will become more apparent from the following detailed description of the preferred embodiment(s) with reference to the attached figures, wherein.

It is noted that in the attached figures, like features bear similar labels.

DETAILED DESCRIPTION OF THE PREFERRED EMBODIMENTS

Figure 1:
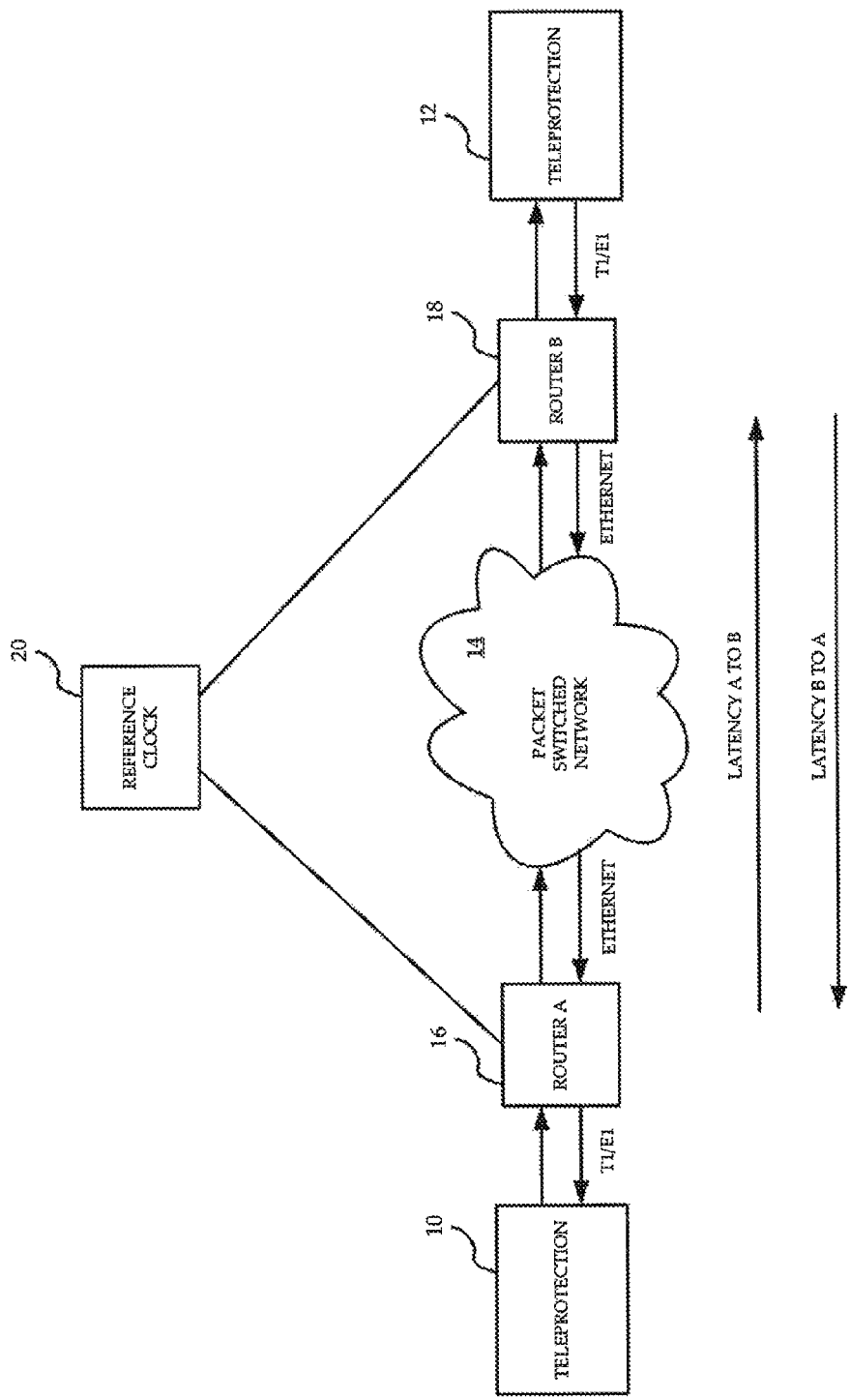
FIG. 1 is a block diagram of a portion of a teleprotection system according to one embodiment of the invention.

Referring to FIG. 1, a block diagram of a portion of a teleprotection system according to one embodiment of the invention is shown. A first teleprotection device 10 communicates with a second teleprotection device 12 through a packet switched network 14. Each teleprotection device 10 and 12 provides teleprotection services, including measurement of power signals. The teleprotection devices 10 and 12 exchange the measurements as packets over the packet switched network 14. The first teleprotection device 10 accesses the packet switched network through a first router 16, and the second teleprotection device 12 accesses the packet switched network 14 through a second router 18. Each router 16 and 18 provides Circuit Emulation Services, encapsulating TDM signals into packets. This allows the teleprotection devices 10 and 12 to communicate with the respective router 16 and 18 using TDM, such as through a T1 line or an E1 line, while the routers 16 and 18 communicate with each other using packets over the packet switched network 14. In this way, from the point of view of the teleprotection devices 10 and 12 the power signal measurements are transmitted in accordance with TDM, yet much of the exchange of these measurements is packet form over the packet switched network 14.

Each router 16 and 18 is in communication with a reference clock 20. The reference clock 20 is usually on a telecommunications node within the packet switched network 14, but is shown in FIG. 1 as separate from the packet switched network 14 for clarity. The reference clock 20 uses IEEE 1588v2 signals to synchronize the clocks of the routers 16 and 20.

Alternatively, a different timing over packet technology system can be used to synchronize the routers 16 and 18 using the reference clock 20.

Being a packet switched network 14, the path followed by packets from the first router 16 to the second router 18 may be different from the path followed by packets from the second router 18 to the first router 16. Even if the same path is used, the store-and-forward mechanisms used throughout the packet switched network 14 may result in different transit times in each direction. The travel time for a packet to leave one router and a second router is referred to as the one-way latency. The one-way latency for packets travelling from the first router 16 to the second router 18 is referred to herein as $L_{AB}$. The one-way latency for packets travelling from the second router 18 to the first router 16 is referred to herein as $L_{BA}$.

Figure 2:
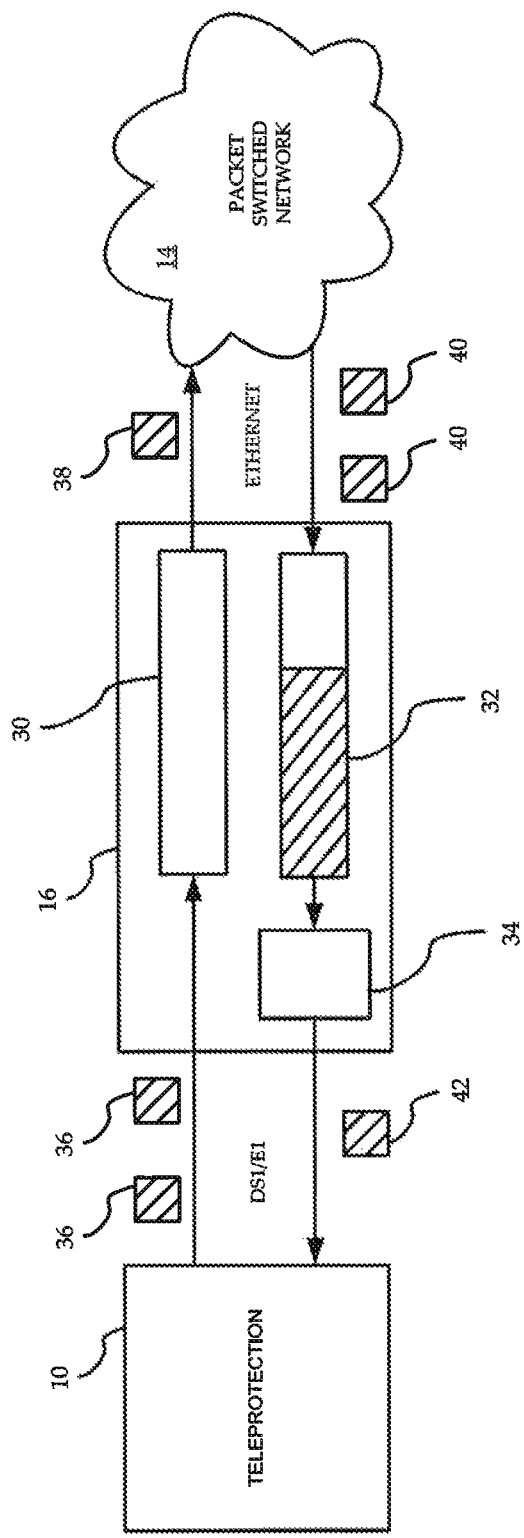
FIG. 2 is a block diagram of a portion of the teleprotection system of FIG. 1, showing a router in greater detail, according to one embodiment of the invention.

Referring to FIG. 2, a block diagram of a portion of the teleprotection system of FIG. 1, showing a router in greater detail, according to one embodiment of the invention is shown. Details of router 16 are shown, but router 18 contains similar components. The router 16 includes a packetization processor 30, a jitter queue 32, and a packet to TDM interworking function 34. Measurements 36 made by the teleprotection device 10 arrive at the router 16 in the TDM bitstream. The measurements are packetized by the packetization processor and sent as outgoing packets 38 to the rest of the packet switched network 14 (and ultimately to the router and teleprotection device at the other end of the teleprotection system). Measurements from the other teleprotection device arrive at the router 16 via the packet switched network 14 as incoming packets 40. The incoming packets 40 are placed in the jitter buffer 32, and then sent to the packet to TDM interworking function 34 where the measurements are played out in the TDM bitstream and sent to the teleprotection device 10.

Figure 3:
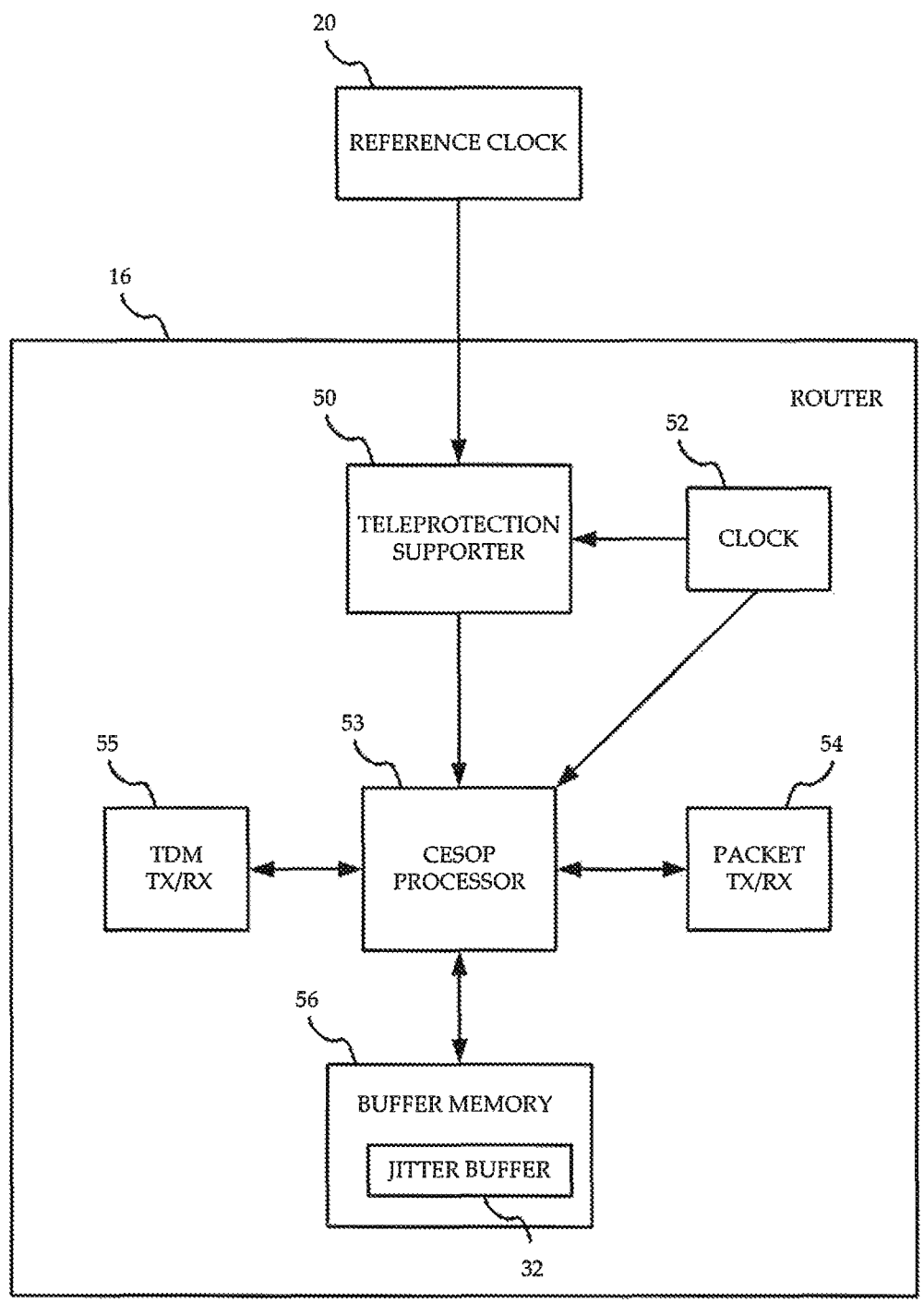
FIG. 3 is a block diagram of parts of either router of FIG. 1 according to one embodiment of the invention.

Referring to FIG. 3, a simplified block diagram of the first router 16 of FIG. 1 according to one embodiment of the invention is shown. In particular, FIG. 3 shows the components of the router 16 involved in Circuit Emulation Service over Packet (CESoP) operations. The second router 18 includes the same components shown in FIG. 3. The first router 16 includes a teleprotection supporter 50. The teleprotection supporter 50 is in communication with the reference clock 20 and with an internal clock 52 of the first router 16. The teleprotection supporter 50 is also in communication with a CESoP processor 53 which controls the CESoP functions of the router. The CESoP processor 53 is in communication with a packet transmit/receive function 54, including a packet switch and interfaces, which in turn is in communication with the rest of the packet switched network 14 (not shown in FIG. 3). The CESoP processor includes the TDM interworking function 34 and is in communication with a TDM transmit/receive function 55, which in turn is in communication with the first teleprotection device 10. The CESoP processor 53 is also in communication with a buffer memory 56. A portion of the buffer memory 56 comprises the jitter buffer 32.

Broadly, in a teleprotection system in which two routers separated by a packet switched network are each in TDM communication with a respective teleprotection device, one of the routers initiates playout of packets to its associated teleprotection device after the fill level of its jitter buffer reaches a playout level. The other router initiates playout of packets to its associated teleprotection device after the fill level of its jitter buffer reaches the playout level and then a duration equal to the difference between the two one-way latencies between the routers has elapsed.

Figure 4:
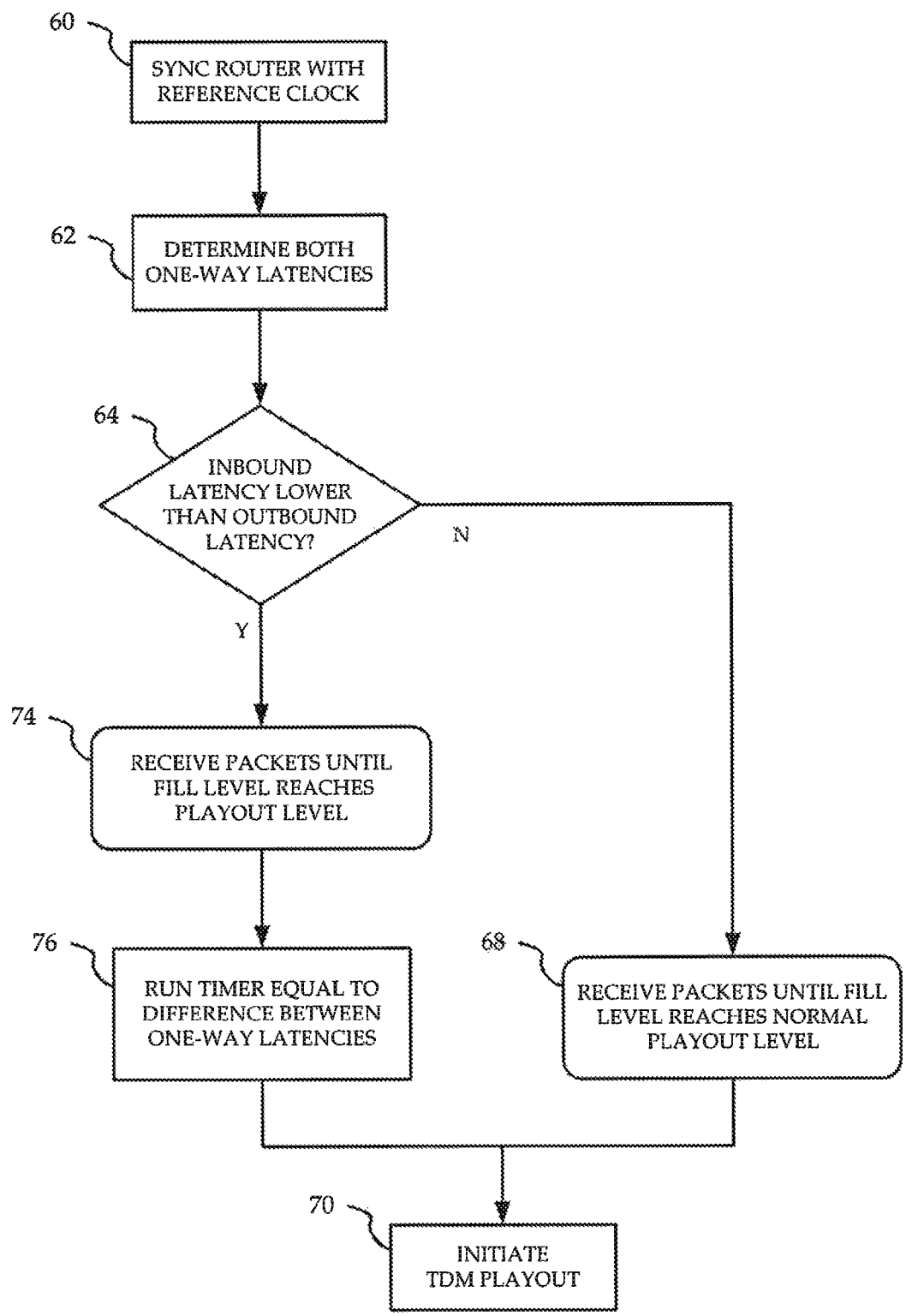
FIG. 4 is a flowchart of a method carried out by either router of FIG. 3 according to one embodiment of the invention.

Referring to FIG. 4, a flowchart of a method carried out by the teleprotection supporter 50 of FIG. 3 according to one embodiment of the invention is shown. A similar method is carried out by the teleprotection supporter of the second router 18. At step 60 the teleprotection supporter 50 synchronizes the first router 16 with the reference clock 20 using IEEE 1588v2, or alternatively using another timing over packet technology, updating the local clock 52. Since the method is also carried out by the teleprotection supporter 50 of the second router 18, the local time of the first router 16 is synchronized with the local time of the second router 18 to a degree enabled by the particular timing over packet technology used to synchronize the routers.

At step 62 the teleprotection supporter 50 determines the one-way latency in each direction with the second router 18. Integrated OAM tool capabilities at the IP Layer (Ping, TWAMP), MPLS layer or Ethernet layer (ITU-T.Y.1731) for example, can be used to determine the one-way latency in each direction. While the two routers 16 and 18 are synchronized (in time), the teleprotection supporter 50 instructs the packet transmit/receive function 54 of the first router 16 to send an OAM packet, with a timestamp (T1) indicated by the local clock 54, to the second router 18. At the second router 18, the OAM packet is received and immediately timestamped (T2) This OAM packet is timestamped again (T3) immediately before it is sent back to the first router 16. When the first router 16 receives this OAM packet, it immediately notes the time (T4). In this way, the first router 16 can deduce the one-way latency from the first router 16 to second router 18 (T2−T1), the one-way latency from the second router 18 to first router 16 (T4−T3), and the round-trip latency (T2−T1+T4−T3). The second router 18 can initiate this same OAM operation as well to determine the one-way latencies. Alternatively other methods of determining each of the one-way latencies can be used. For the first router 16, the one-way latency from the second router 18 to the first router 16 is termed herein as the inbound latency and the one-way latency from the first router 16 to the second router 18 is termed herein as the outbound latency. Similarly, for the second router 18 the one-way latency from the first router 16 to the second router 18 is termed herein as the inbound latency and the one-way latency from the second router 18 to the first router 16 is termed herein as the outbound latency.

At step 64 the teleprotection supporter 50 determines whether it is the destination router of the lower of the two one-way latencies, in other words whether the inbound latency is lower than the outbound latency. If not, that is the one-way latency for packets sent from the first router 16 to the second router 18 is lower than the one-way latency for packets send from the second router 18 to the first router 16, then the teleprotection supporter 50 waits while the jitter buffer 32 receives packets at step 68 as the second teleprotection device 12 sends messages to the first teleprotection device 10. Once a playout level of the jitter buffer 32 is reached, the teleprotection supporter 50 initiates TDM playout of the packets in the jitter buffer 32 at step 70, and the packets are sent to the packet to TDM interworking function 32 for sending as messages to the first teleprotection device 10. The playout level is typically 50% of the size of the jitter buffer 32, but of course different values may be used.

If the teleprotection supporter 50 determines at step 64 that the inbound latency is lower than the outbound latency, that is the one-way latency for packets sent from the first router 16 to the second router 18 is greater than the one-way latency for packets send from the second router 18 to the first router 16, then the first router 16 must delay transmission of teleprotection messages to the first teleprotection device 10. The teleprotection supporter 50 waits while the jitter buffer 32 receives packets at step 74 as the second teleprotection device 12 sends messages to the first teleprotection device 10. Once sufficient packets have been received so that a playout level of the jitter buffer 32 is reached, the teleprotection supporter 50 runs a timer at step 76. The duration of the timer is equal to the difference in the two one-way latencies. The router 16 continues to accept packets while the timer is running and the jitter buffer 32 may continue to fill. Once the timer is finished, the teleprotection supporter 50 initiates TDM playout of the packets in the jitter buffer 32 at step 70, and the packets are sent to the packet to TDM interworking function 32 for sending as messages to the first teleprotection device 10.

The method described above with reference to FIG. 4 is merely one way of causing a delay of transmission of the appropriate duration. Alternatively other methods of delaying transmission of messages to the teleprotection device for the destination router of the faster direction can be effected, as long as the delay accounts for the difference between the determined one-way latencies so that messages reach the teleprotection devices 10 and 12 in synchronicity. For example, the playout level for each jitter buffer can be set to a different value. At the destination router of the faster direction, playout is initiated when the fill level of jitter buffer reaches the normal playout level plus an amount dictated by the difference in the one-way latencies, while playout is initiated at the other router when the fill level of its jitter buffer reaches the normal playout level.

In the method described with reference to FIG. 4, a step of synchronizing the router using IEEE 1588v2 or other timing over packet technology is used. Alternatively synchronization of the router could be carried out separately from the teleprotection supporter 50, by another component or functionality. As yet another alternative, the routers could already have been synchronized using IEEE 1588v2 or other timing over packet technology, or by co-located GPS receivers. In any of these alternatives, the method shown in FIG. 4 would be altered by removing the explicit step 60 of synchronizing the routers with the reference clock.

In the method described above with reference to FIG. 4, the teleprotection supporter 50 monitors the fill level of the jitter buffer and initiates playout when the fill level reaches the appropriate level. Alternatively these steps can be carried out by the CESoP processor 53. In such an embodiment, the teleprotection supporter 50 runs the timer before which playout is to be initiated, as described above, and when the duration of the timer expires indicates to the CESoP processor 53 that playout is to be initiated. The method carried out by the teleprotection supporter 50 in such an embodiment can be understood by changing step 70 of FIG. 4 to notifying the CESoP processor that TDM playout is to be initiated. The teleprotection supporter 50 can still be said to initiate the TDM playout, since playout only occurs upon the teleprotection supporter 50 determining that it is appropriate to do so and then taking an action.

The teleprotection supporter described above is preferably implemented as logical instructions in the form of software. Alternatively, the teleprotection supporter may be implemented as hardware, or as a combination of software or hardware. If in the form of software, the logic of the teleprotection supporter may be stored on a non-transitory computer-readable storage medium in a form executable by a computer processor. The logic of the teleprotection supporter may be implemented by a general purpose processor, a network processor, a digital signal processor, an ASIC, or multiple such devices.

Figure 5:
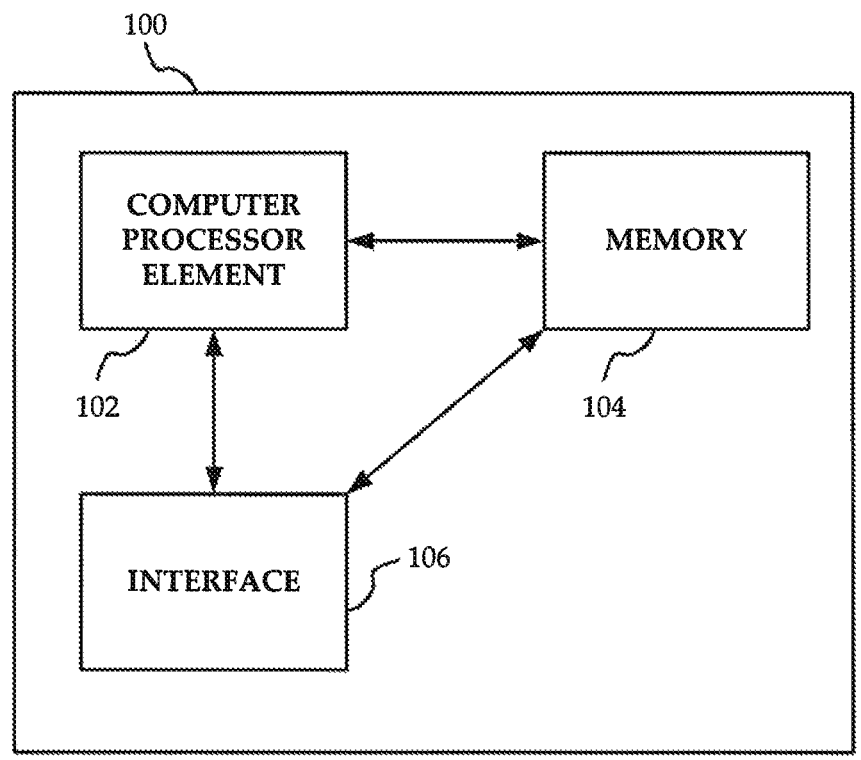
FIG. 5 is a block diagram of a computing environment according to one embodiment of the invention.

The symmetric transmission of TDM data can assist applications other than teleprotection. As such, the teleprotection supporter 50 is just one embodiment of a more broadly named symmetry enforcer. The symmetry enforcer establishes the delay required in TDM playout of data to any devices which communicate through a packet switched network A simplified block diagram of one embodiment of the teleprotection supporter is shown in FIG. 5 as a processor assembly 100. The processor assembly 100 includes a computer processor element 102 (e.g. a central processing unit and/or other suitable processor(s)). The computer processor element 102 has access to a memory 104 (e.g. random access memory, read only memory, and the like). The processor element 102 and the memory 104 are also in communication with an interface comprising various I/O devices 106 (e.g. a user input device (such as a keyboard, a keypad, a mouse, and the like), a user output device (such as a display, a speaker, and the like), an input port, an output port, a receiver, a transmitter, and a storage device (such as a tape drive, a floppy drive, a hard disk, a compact disk drive, and the like)). In one embodiment, the teleprotection supporter is implemented as software instructions loaded into the memory 104 and causing the computer processor element 102 to execute the methods described above.

The embodiments presented are exemplary only and persons skilled in the art would appreciate that variations to the embodiments described above may be made without departing from the spirit of the invention. The scope of the invention is solely defined by the appended claims.

We claim:

1. A method of providing Circuit Emulation Service over Packet (CESoP) over a packet switched network, the packet switched network including a first router in TDM communication with a first device and a second router in TDM communication with a second device, the first router and the second router being separated by the packet switched network, the method comprising:
    determining the one-way latency from the second router to the first router, this latency being termed the inbound latency;
    determining the one-way latency from the first router to the second router, this latency being termed the outbound latency;
    comparing the inbound latency and the outbound latency;
    if the outbound latency is lower than the inbound latency, initiating TDM playout to the first device when a jitter buffer reaches a playout level; and
    if the inbound latency is lower than the outbound latency, initiating TDM playout to the first device after the jitter buffer reaches the playout level and then a duration equal to the difference between the inbound latency and the outbound latency has elapsed.

2. The method of claim 1 further comprising:
    synchronizing the first router with a reference clock using IEEE 1588v2.

3. The method of claim 1 wherein initiating TDM playout to the first device after the jitter buffer reaches the playout level and a duration equivalent to the difference between the inbound latency and the outbound latency comprises:
    waiting for the jitter buffer to reach the playout level;
    then running a timer for the duration; and
    initiating TDM playout upon expiry of the timer.

4. The method of claim 1 wherein determining each one-way latency comprises:
    sending a first ping packet to the second router;
    noting the timestamp of a second ping packet sent by the second router;
    determining the inbound latency as the difference between the timestamp of the second ping packet and a local time of the router; and
    determining the outbound latency as the difference between the round-trip time of the first ping packet and the inbound latency.

5. The method of claim 1 wherein each device is a teleprotection device, and wherein TDM playout comprises TDM playout of teleprotection measurements.

6. A first router providing Circuit Emulation Service over Packet (CESoP) to a first device, comprising:
    a CESoP processor for receiving packets received over a packet switched network and playing out the packets into a TDM bitstream to the first device;
    a jitter buffer; and
    a symmetry enforcer for determining a difference between (1) the one-way latency from the first router to a second router providing CESoP to a second device and with which the first router is in communication over the packet switched network and (2) the one-way latency from the second router to the first router, and for initiating TDM playout to the first device after the fill level of the jitter buffer reaches a playout level and then a duration equal to the difference between the one-way latencies has elapsed.

7. The first router of claim 6, wherein the symmetry enforcer is configured to synchronize the first router with a reference clock using IEEE 1588v2.

8. The first router of claim 6 wherein the symmetry enforcer initiates TDM playout by notifying the CESoP processor that TDM playout is to commence.

9. The first router of claim 6 wherein the symmetry enforcer initiates TDM playout by:
    waiting until the fill level of the jitter buffer reaches the playout level;
    then running a timer of duration equal to the difference between the one-way latencies; and
    upon expiry of the timer, initiating TDM playout.

10. The first router of claim 6 wherein each device is a teleprotection device, and wherein TDM playout comprises TDM playout of teleprotection measurements.

11. A method of providing Circuit Emulation Service over Packet (CESoP) over a packet switched network, the packet switched network including a first router in TDM communication with a first device and a second router in TDM communication with a second device, the first router and the second router being separated by the packet switched network, the method comprising:
    at each router, determining the one-way latency from the second router to the first router, this latency being termed the inbound latency for the first router and the outbound latency for the second router;
    at each router, determining the one-way latency from the first router to the second router, this latency being termed the outbound latency for the first router and the inbound latency of the second router;
    at each router, comparing the inbound latency and the outbound latency of the router;
    at each router, if the outbound latency of the router is lower than the inbound latency of the router, initiating TDM playout to the device in TDM communication with the router when the jitter buffer of the router reaches a playout level; and
    at each router, if the inbound latency of the router is lower than the outbound latency of the router, initiating TDM playout to the device in TDM communication with the router after the jitter buffer of the router reaches the playout level and then a duration equal to the difference between the inbound latency and the outbound latency has elapsed.

12. The method of claim 11 further comprising:
synchronizing each router with a reference clock using IEEE 1588v2.

13. The method of claim 11 wherein at each router, initiating TDM playout to the device after the jitter buffer reaches the playout level and then a duration equivalent to the difference between the inbound latency and the outbound latency has elapsed comprises:
waiting for the jitter buffer to reach the playout level;
then running a timer for the duration; and
initiating TDM playout upon expiry of the timer.

14. The method of claim 11 wherein each device is a teleprotection device, and wherein TDM playout comprises TDM playout of teleprotection measurements.

15. A system for providing CESoP between two devices, comprising:
a first router at the edge of a packet switched network and in TDM communication with a first of the devices, the first router having a jitter buffer, the first router initiating TDM playout of packets to the first device after the fill level of its jitter buffer reaches a playout level; and
a second router at the edge of the packet switched network and in TDM communication with the second of the devices, the second router having a jitter buffer, the second router initiating TDM playout of packets to the second device only after the fill level of its jitter buffer reaches the playout level and then a duration equal to the difference between the two one-way latencies between the routers has elapsed.

16. The system of claim 15, wherein each router calculates each one-way latency.

17. The system of claim 16 wherein as part of calculating each one-way latency, each router sends a ping packet to the other router.

18. The system of claim 15, wherein the first router and the second router are each synchronized with a reference clock using IEEE 1588v2.

19. The system of claim 15 each device is a teleprotection device, and wherein TDM playout comprises TDM playout of teleprotection measurements.

* * * * *